(12) United States Patent
Marston et al.

(10) Patent No.: US 7,769,398 B2
(45) Date of Patent: Aug. 3, 2010

(54) BROADBAND WIRELESS DISTRIBUTION SYSTEM FOR MOBILE PLATFORM INTERIOR

(75) Inventors: Scott E. Marston, Bellevue, WA (US); Sudhakar S. Shetty, Mercer Island, WA (US); Del Silva, Kenmore, WA (US); Zhaofeng Ma, Bothell, WA (US); Nathaniel T. Horton, Seattle, WA (US)

(73) Assignee: The Boeing Company, Chicago, IL (US)

( * ) Notice: Subject to any disclaimer, the term of this patent is extended or adjusted under 35 U.S.C. 154(b) by 2226 days.

(21) Appl. No.: 10/295,422

(22) Filed: Nov. 15, 2002

(65) Prior Publication Data
US 2004/0098745 A1 May 20, 2004

(51) Int. Cl.
*H04N 7/16* (2006.01)
(52) U.S. Cl. .................. 455/463; 455/517; 455/412; 455/67.1; 455/522; 455/508; 455/413; 340/825; 340/311
(58) Field of Classification Search .................. None
See application file for complete search history.

(56) References Cited

U.S. PATENT DOCUMENTS

| | | | |
|---|---|---|---|
| 4,428,078 A | 1/1984 | Kuo | |
| 5,670,742 A | 9/1997 | Jones | |
| 6,249,913 B1 | 6/2001 | Galipeau et al. | |
| 6,477,152 B1 | 11/2002 | Hiett | |
| 2002/0067711 A1 | 6/2002 | Kobayashi | |
| 2002/0160773 A1 | 10/2002 | Gresham et al. | |
| 2003/0009761 A1* | 1/2003 | Miller et al. | 725/76 |

FOREIGN PATENT DOCUMENTS

| | | |
|---|---|---|
| EP | 1 096 699 A2 | 5/2001 |
| EP | 1 209 928 A2 | 11/2001 |
| WO | WO 01/97433 A2 | 12/2001 |
| WO | WO 02/080487 A2 | 10/2002 |

OTHER PUBLICATIONS

Wanjiun, Liao: "Mobile Internet Telephony: Mobility Extension to H.323" IEEE Transactions on Vehicular Technology, vol. 50, No. 6, Nov. 6, 2001, pp. 1403-1414, XP011064326.
Schobinger, Matthias; Meier, Stefan R.: "DSP-Based Signal Processing for OFDM Transmission" May 7, 2001, pp. 1249-1252, XP010803644.

* cited by examiner

*Primary Examiner*—Charles N Appiah
*Assistant Examiner*—Randy Peaches
(74) *Attorney, Agent, or Firm*—Harness, Dickey & Pierce, P.L.C.

(57) ABSTRACT

A broadband wireless distribution network for a passenger cabin area of a mobile platform. The broadband wireless distribution network includes a plurality of wireless access points (WAPs) connected to a server and switching system and a plurality of wireless network interface circuits (NICs) strategically located about the passenger cabin. Additionally the broadband wireless distribution network includes a plurality of antennas connected to the WAPs such that at least one antenna is connected to each WAP. The antennas are capable of providing RF coverage patterns to specific overlapping areas within the passenger cabin, thereby allowing communication between each WAP and at least one NIC.

23 Claims, 4 Drawing Sheets

BROADBAND WIRELESS DISTRIBUTION SYSTEM FOR MOBILE PLATFORM INTERIOR

FIELD

The disclosure relates generally to mobile networks used to distribute data throughout a passenger cabin area of a mobile platform, for example an aircraft, bus, ship or train. More specifically, the disclosure relates to a broadband wireless video, audio, data, and control distribution system for a mobile platform passenger cabin area. This broadband wireless distribution system is a data network backbone for distributing in-transit entertainment (ITE) functionality to the passenger cabin area.

BACKGROUND

Current audio/video distribution systems for mobile platform, for example aircraft, passenger cabin areas are heavy and bulky. The extensive seat-to-seat distribution cabling is prone to damage and failure, and must be completely removed and replaced any time the cabin is re-configured. Even more cabling is required when audio/video coordination between seat rows is required e.g., synchronizing headset audio with a video display on the back of the next-forward seat row. When a new data service is installed in a mobile platform with an existing audio/video system, cables for transmission of signals and power to each seat receiver in the mobile platform are required to provide the two separate services. These cables impose an additional weight penalty and add further maintenance time requirements.

BRIEF SUMMARY OF THE INVENTION

In one embodiment of the present disclosure, a broadband wireless distribution network for a passenger cabin area of a mobile platform is provided. The broadband wireless distribution network includes a plurality of wireless access points (WAPs) connected to a head end unit and a plurality of wireless network interface circuits (NICs) strategically located about the passenger cabin. Additionally the broadband wireless distribution network includes a plurality of specially shaped antennas connected to the WAPs such that at least one specially shaped antenna is connected to each WAP. The specially shaped antennas are adapted to provide RF coverage to specific overlapping areas within the passenger cabin, thereby allowing communication between each WAP and at least one NIC.

In another embodiment of the present disclosure a method is provided for using a wireless distribution network to communicate data within a passenger cabin area of a mobile platform. The method includes communicating data between a head end unit, having at least one audio/video server, and a plurality of wireless access points (WAPs). Additionally, the method includes transmitting data between the WAPs and a plurality of wireless network interface circuits (NICs) using a plurality of specially shaped antennas. At least one specially shaped antenna is connected to each WAP. Furthermore, the method includes operating each specially shaped antenna such that each specially shaped antenna controls a specific radio frequency (RF) coverage area. The specific RF coverage area controlled by each antenna overlaps with at least one of the other specific RF coverage area.

Therefore, an advantage of the present disclosure is that by utilizing a broadband wireless system seat-to-seat cabling for audio, video, and data distribution is eliminated. Another advantage of the present disclosure is that a high bandwidth is provided to serve audio, video, data, and control to a large number of users in a densely filled passenger cabin area. Yet another advantage of the present disclosure is that electromagnetic interference with other mobile platform subsystems and external subsystems is reduced. Still yet another advantage of the present disclosure is to that the need for "feed-forward" cabling to coordinate audio/video signals between seat rows is eliminated. An even further advantage of the present disclosure is that wireless access point (WAP) layout and transmission power are optimized, thereby reducing interference and multi-path issues inside the mobile platform. A still further advantage of the present disclosure is that an antenna pattern and layout are optimized so that passenger cabin coverage is provided using a minimum number of WAPs.

BRIEF DESCRIPTION OF THE DRAWINGS

The present disclosure will become more fully understood from the detailed description and accompanying drawings, wherein;

FIG. 4b is a schematic of a side view of the specially shaped patch antenna shown in FIG. 4a.

DETAILED DESCRIPTION OF THE VARIOUS EMBODIMENTS

Figure 1:
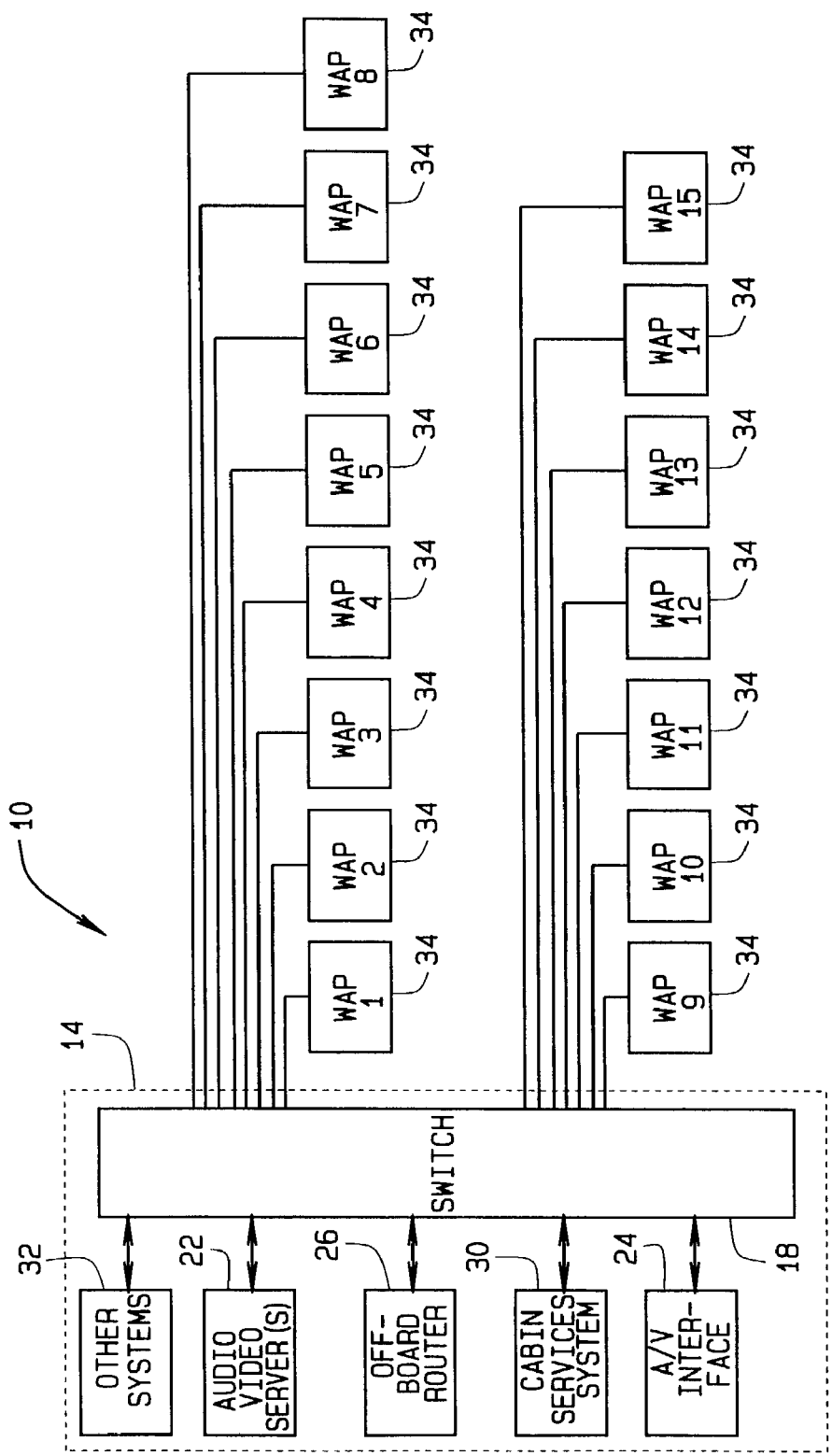
FIG. 1 is schematic of a network architecture for a broadband wireless distribution system for the interior of mobile platform, in accordance with the present disclosure.

FIG. 1 is schematic of a broadband wireless distribution system 10 for wireless distribution of data within the interior of a mobile platform, in accordance with the present disclosure. Wireless distribution system 10 includes a server and switching system 14 that includes at least one central switch 18 and at least one audio/video server 22 in communication with the switch 18. Additionally, server and switching system 14 includes at least one audio/video (A/V) interface 24 in communication with switch 18, an off-board router 26 in communication with the switch 18, and at least one cabin services system (CSS) interface 30 also in communication with switch 18. Off-board router 26 is used to provide Internet communications links between users on board the mobile platform and at least one server system or computer-based device located remotely from the mobile platform. The CSS interface 30 provides access to control a passenger reading light, an attendant call light, and a public address system for crew announcements.

Furthermore, server and switching system 14 includes at least one interface 32 to permit communications with at least one other mobile platform system, such as an on-board navigation system, or an onboard health management system. For example, system 10 can use navigation data from the on-board navigation system to present moving-map displays to passengers. System 10 permits the on-board health management system to communicate with fixed location medical personnel and to send health data regarding an ill passenger or crew member as well as to receive remedial instructions on emergency steps to take while on the mobile platform. Server and switching system 14 utilizes server 22 to transmit, receive and store in-transit entertainment and other data that is provided to a plurality of wireless access points (WAPs) 34. Preferably, WAPs 34 are located above ceiling panels in a passenger cabin area of the mobile platform. However, WAPs 34 may be located at any suitable location within the passenger cabin area, for example in seat backs of passenger seats, in or mounted on sidewalls of the passenger cabin, or below the floor of the passenger cabin.

Although the detailed description herein is directed to an in-flight wireless distribution system delivering in-flight entertainment and other data to passenger seats on commercial aircraft, the disclosure is also applicable to other modes of mass transit such as ship, train, bus, and others. Accordingly, the reference to aircraft should not be construed as limiting the scope of the present disclosure. Accordingly, "in-flight wireless distribution" is also referred to as "mobile wireless distribution" to encompass other modes of transportation to which the present disclosure may be applied.

In operation, the server and switching system 14 utilizes audio/video server 22, off-board router 26 and the CSS interface 30 to execute functional elements through software. For example, server and switching system 14 executes functional elements such as analog and/or digital audio, video, and audio/video on demand (AVOD). Additionally, server and switching system 14 can execute functional elements such as live TV via satellite, Internet, intranet, email access, gaming, data storage, web caching and storage, CD and DVD players, and other sound and video devices. Furthermore, central switch 18 utilizes software to enable data functions such as transmitting and receiving entertainment programming data and other data to and from the WAPs 34, built in test equipment data loading, satellite data interfacing, multiplexing, mapping, zone standard client support service interfacing, packet switching system data processing, multimedia routing, and avionics data standard interfacing. Data is transmitted from server and switching system 14 to the appropriate WAPs 34 over wired connections, for example an Ethernet or other suitable local networks.

Figure 2:
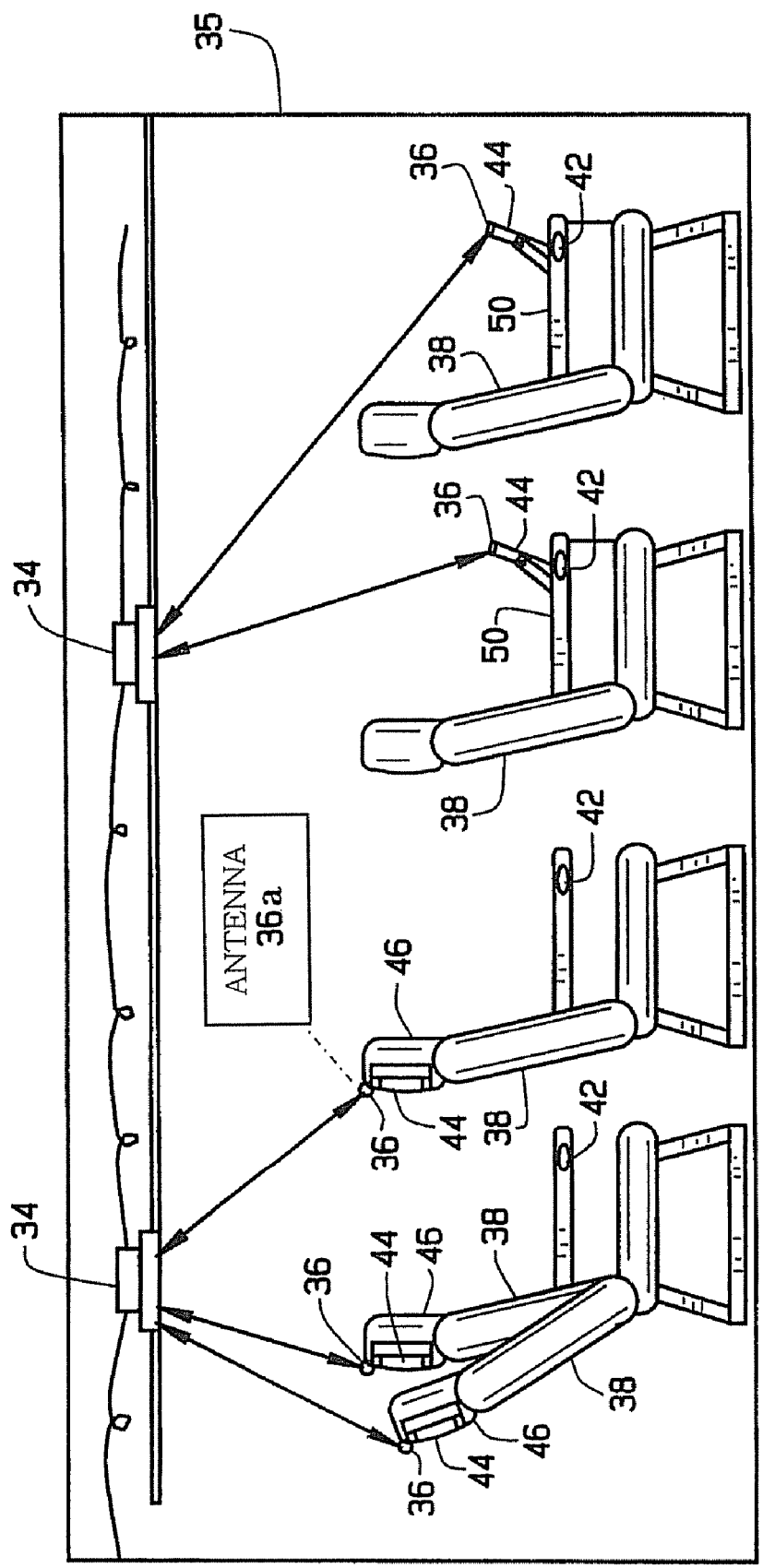
FIG. 2 is a schematic of a section of a mobile platform passenger cabin area wherein the system shown in FIG. 1 is implemented.

The in-transit entertainment and other data is broadcast using radio frequency (RF) signals, via WAPs 34, to designated areas of the passenger cabin that each include a plurality of passenger seats 38 (shown in FIG. 2). Each designated area includes other components of in-flight wireless distribution system 10, such as passenger control units (PCUs) 42 (shown in FIG. 2), seat video display terminals (SVDTs) 44 (shown in FIG. 2) and mobile crew computing terminals (not shown).

The in-transit and other data is broadcast to groups of seats 38 and any PCUs 42, SVDTs 44, or mobile crew computing terminals in its coverage area, as described below in reference to FIGS. 2, 3 and 4. Return data follows the same path in reverse. In one embodiment, wireless distribution system 10 is all digital and server and switching system 14 utilizes Internet protocol (IP) multicast and voice over IP (VOIP) to reduce bandwidth requirements. IP multicast is a method of identifying data frames sent by a sender so that multiple recipients may receive the same frames without the sender having to send a separate copy to each receiver. For audio and video streaming, the server and switching system 14 sends the data as one multicast stream such that some, none, or all the SVDTs 44 and PCUs 42 can choose to receive the data simultaneously.

VOIP is a method of efficiently encoding telephone or other voice signals into digital data packets compatible with standard data networks, such as Ethernet networks. Using VOIP in wireless distribution system 10, allows public address announcements, individual telephone calls, and conference calls between multiple passengers to be carried over wireless distribution system 10, with minimal use of network bandwidth.

FIG. 2 is a schematic of a section of a mobile platform passenger cabin area 35 wherein wireless distribution system 10 is utilized in accordance with the present disclosure. Unlike known ITE systems, wireless distribution system 10 has no dedicated seat electronics box (SEB). Rather, wireless distribution system 10 includes a wireless network interface circuit (NIC) 36 at each passenger seat 38 that is integrated into the PCU 42 and/or SVDT 44 that are mounted to each passenger seat 38. Each wireless NIC includes an antenna 36a for enabling the wireless transmissions. Each PCU 42 comprises a passenger interactive device, such as a computer, a computer terminal to which a passenger can connect a computerized device, or a headset for emitting audio transmissions.

The SVDT 44 for each seat 38 receives and transmits audio/video entertainment and other data to and from server and switching system 14 via radio frequency communications between the related wireless NIC 36 and a specific WAP 34. The PCU 42 for each seat 38 similarly transmits passenger commands, passenger device data, and passenger telephony data through its NIC 36 to a specific WAP 34, and receives audio data and passenger device data from the WAP 34. Passenger commands are initiated by pressing or setting passenger command buttons, switches and/or other control devices (not shown) on PCU 42. Passenger device data includes such things as Internet data. Each wireless NIC 36 and PCU 42 can be located on a head rest portion 46 of seat 38, on a armrest portion 50 of seat 38 or at any other location conveniently accessible by a passenger.

In an alternate embodiment, PCU 42 functionality, such as passenger command buttons, audio headset jack, etc., can be integrated into the SVDT 44 on the head rest portion 46 of seat 38 or in the arm rest portion of seat 38 for armrest mounted SVDTs 44.

Figure 3:
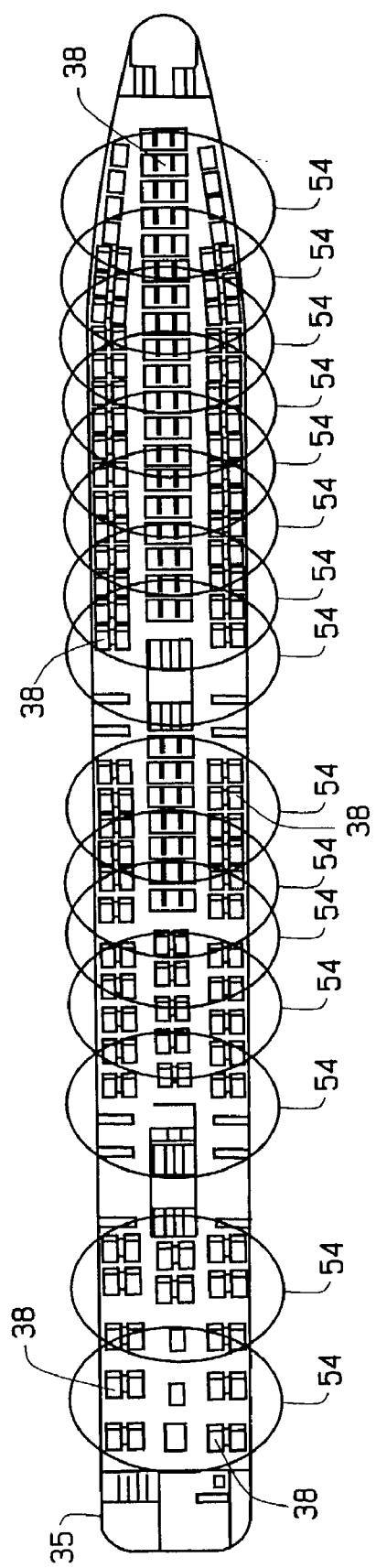
FIG. 3 is a graphical representation of an entire mobile platform passenger cabin area showing an antenna pattern coverage for the WAPs included in the wireless distribution system shown in FIG. 1.

FIG. 3 is a graphical representation of the entire mobile platform passenger cabin area 35 showing an antenna pattern coverage area of the WAPs 34. In an embodiment, the WAPs 34 operate on different, non-overlapping radio channels providing overlapping coverage sectors 54 of passenger cabin area 35. For example, wireless distribution system 10 can function such that WAPs 34 operate on eight to twelve non overlapping channels in the 5 GHz UNII bands, wherein each channel operates at a nominal bit rate of 54 megabits per second and covers approximately fifteen to twenty seats 38. A channel is a logical assignment of a frequency, or range of frequencies, used to distinguish a logical path of communication. Preferably, each channel is centered on a single frequency with a predetermined amount of frequency space on either side of the center. For example, a channel can be 20 MHz wide centered at 5.180 GHz.

Typically standard audio video digital encoding methods, such as MPEG-1 and MPEG-2, require 3 or more megabits per second for a high quality video stream that includes stereo sound and multiple language tracks. With newer MPEG-4 audio/video digital encoding standards, a similar quality audio/video stream can be encoded for a seat-sized display, such as SVDT 44, at about 1 megabit per second encoding rate. Wireless orthogonal frequency division multiplexing (OFDM) standards, such as IEEE 802.11a, provide between 20 and 30 Megabits per second usable data bandwidth per radio channel or, per WAP 34 operating on a single radio channel. Therefore, one WAP 34 can serve full audio/video to approximately 20 passengers simultaneously, with extra bandwidth for network overhead and administrative functions.

Because there is physical overlap of the WAP 34 coverage sectors 54, as shown in FIG. 3, broadband wireless system 10 has inherent fault tolerance to a failure of any given WAP 34. In an embodiment, system 10 is implemented such that if the PCU 42 or SVDT 44 at a given seat can no longer communicate with its assigned WAP 34, the PCU 42 or SVDT 44 will re-associate to a different WAP 34 providing an overlapping sector 54 on a new channel. Load-balancing software (not shown) in server and switching system 14 commands each NIC 36 in each PCU 42 or SVDT 44 as to which new WAP 34 to associate with, based on the current data demands in the surrounding passenger seats.

In another embodiment, the WAPs 34 provide overlapping coverage sectors 54 utilizing some WAPs 34 operating on non-overlapping channels and other WAPs 34 operating on overlapping channels. For example, one OFDM wireless networking standard, IEEE Standard 802.11a-1999, defines twelve usable non-overlapping radio channels within the United States UNII radio bands. In this embodiment, broadband wireless distribution system 10 is set up such that a forward-most WAP 34 uses a first radio channel, the next WAP 34 uses a second channel, and so on. The first two WAPs 34 provide coverage to physically overlapping sectors 54, such that a given NIC 36 transmits to the first WAP 34 on the first radio channel, or to the second WAP 34 on the second radio channel. If more than twelve WAPs 34 are installed in the mobile platform, then the thirteenth WAP 34 will be assigned to use the first radio channel again, which, if not constrained to a different physical sector 54 in the mobile platform, will "overlap," or interfere with, the first radio channel. This "re-use" of a radio channel by more than one WAP 34 within the mobile platform is possible within the confines of a mobile platform, such as an aircraft, because the controlled transmit power and shaped antenna patterns, as well as spatial separation, keep the RF signals from the first WAP 34 from having any significant interference with those of the thirteenth WAP 34.

Figure 4A:
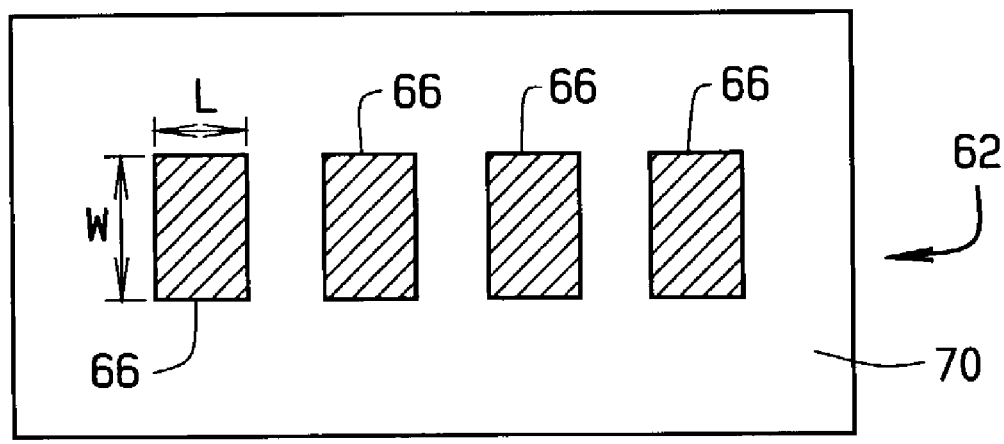
FIG. 4a is a schematic of a top view of a specially shaped patch antenna used to provide the pattern coverage shown in FIG. 3.
Figure 4B:
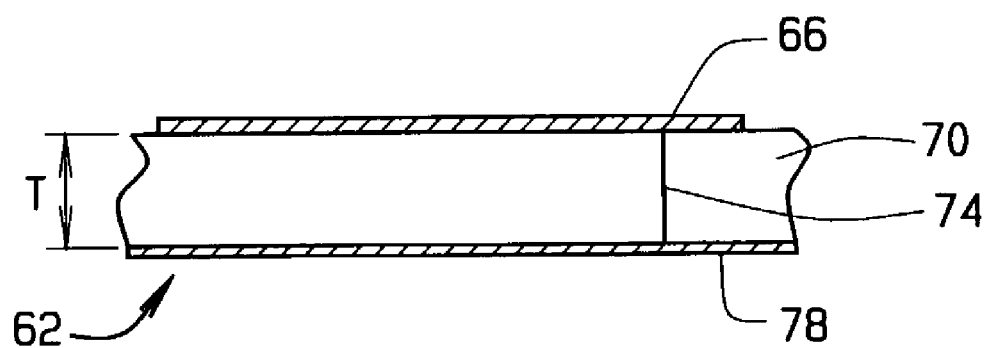

FIGS. 4a and 4b are schematics of a top view and side view, respectively, of a specially shaped patch antenna 62 used to provide the overlapping pattern coverage sectors 54 (shown in FIG. 3). The transmitted electromagnetic energy of wireless distribution system 10 is controlled through specially shaped patch antennae 62 and reduced transmission power to ensure no disruption of other mobile platform systems. At least one specially shaped patch antenna 62 is connected to each WAP 34. Alternatively, patch antenna 62 can be included in each WAP 34. In one embodiment, specially shaped patch antenna 62 comprises a rectangular patch, linear array antenna including four rectangular array elements 66. Antenna 62 generates a "fan-beam" radiation pattern, which is narrow in one direction and broad in the other, illustrated by coverage sectors 54 in FIG. 3. Additionally, antenna 62 is oriented to directly radiate coverage sectors 54 (shown in FIG. 3) that encompass only a small number of seats 38 (shown in FIG. 2) in the passenger cabin 35. For example, with the array elements 66 oriented along a longitudinal axis of a single aisle mobile platform, the antenna pattern 54 will cover all seats within a row, i.e. window to window, but will only cover about three to four rows limiting the number of users to approximately twenty.

In addition to its tailored radiation pattern 54, another benefit of patch antenna 62 is that it has a low profile. In an embodiment, antenna 62 has a height of approximately one-sixteenth (0.125) of an inch to three-sixteenths (0.1825) of an inch (1.588 mm to 4.762 mm), making placement of antenna 62 in the passenger cabin overhead area less obtrusive than other types of highly directional antennas that have larger dimensions, for example horn antennas. Antenna elements 66 are linearly oriented and evenly spaced rectangular elements etched on one side of a printed circuit board (PCB) substrate 70. Alternatively, elements 66 can be mounted on PCB 70, for example surface mounted. A coaxial feed 74 connects each element 66 to a ground plane 78 on an opposing side of PCB 70 to the element indicated. A length (L) of each element 66, a width (W) of each element 66, a spacing (D) between elements 66, a thickness (T) of PCB substrate 70, a substrate dielectric constant (not shown), and dimensions of the ground plane 78 are all chosen based on a desired frequency and input impedance. In one preferred form, length L is about 0.433 inches (1.1 cm), width W is about 0.709 inches (1.8 cm), spacing D is about 0.640 inches (1.625 cm), thickness T is about 0.125 inches (0.3175 cm), the substrate electric constant is about 4.5, and the dimensions of the ground plane 78 are about 6.801 inches by 3.858 inches (17.275 cm×9.8 cm), resulting in a frequency of approximately 5-6 GHz.

The electrical current supplied to each element is weighted or "tapered" so that each of the four elements 66 receives a desired amount of current needed to reduce side-lobe radiation, thereby reducing interference with other mobile platform systems. For example, a 1-2-2-1 current taper, where the middle two elements 66 received twice the current as the outer two elements 66, could be used to reduce side-lobe levels. In one embodiment, the current taper is realized using coax cables and power dividers (not shown). In an alternate embodiment, the current taper can be realized using microstrip lines that can be etched onto the same PCB 70 as the antenna elements 66. Preferably, the micro-strip lines are etched on the same side of PCB 70 as the antenna elements 66. Alternatively, PCB comprises a three layer board and the micro-strip lines are etched on the opposite side of the three layer board with the middle layer providing the ground plane for the antenna elements 66.

Wireless receiver electronics in WAPs 34 and NICs 36 (not shown) use sophisticated OFDM and advanced digital signal processing (DSP) to achieve a very high level of immunity to interference from other mobile platform systems. OFDM encodes data and error detection information across a large number of RF carrier frequencies to enable the receiver to decode and reconstruct the transmitted data despite the loss or corruption of some of the data being transmitted by one or more of the carrier signals. Advanced DSP capability is needed in order to perform this encoding, decoding, and reconstruction at the very high speeds required to support the channel data rates.

These features are especially useful in a mobile platform such as a commercial aircraft, where there is a large amount of RF reflection within the metal fuselage. This large reflection can result in severe data loss, or at least a significant reduction in the available data bandwidth, without the use of OFDM and DSP technologies.

In an alternate embodiment, there are other technologies, e.g., ultra-wideband (UWB), that would operate similarly and might be equally applicable. UWB is a spread spectrum technology that is an alternative to high bandwidth wireless networks. UWB provides a higher bandwidth and potentially better electromagnetic noise immunity, than widely utilized OFDM technology. Wireless distribution system 10 is adapted to operate utilizing either UWB or OFDM technology.

In one embodiment, wireless distribution system 10 enables wireless communication between the PCU 34 mounted on, or in, arm rest 50 and SVDT 44 on the seat back of the next forward seat 38 such that the PCU 34 controls on screen features of the SVDT 44. In current IFE systems, an audio/video stream is transmitted to a Seat Electronic Box (SEB) located in the row where the viewer is seated. If that viewer's video display is installed on the back of the seat in front of the viewer, then the viewer's SEB receives the audio/video signal, sends the audio portion to the viewer's headphone jack in his/her seat arm, and sends the synchronized video signal to the viewer's video display. The synchronized signal is sent through a "feed-forward" cable that is installed between the viewer's SEB the video display in the next-forward row. In this embodiment, the PSUs 34 of both the involved seat groups receive the same audio/video stream as an IP multicast stream and extract the audio or video portion as required. This eliminates the need for "feed forward" cabling or for doubling the bandwidth requirement for two identical streams.

While the disclosure has been described in terms of various specific embodiments, those skilled in the art will recognize that the disclosure can be practiced with modification within the spirit and scope of the claims.

What is claimed is:

1. A broadband wireless distribution system for a mobile platform passenger cabin area comprising:
a server and switching system including at least one audio/video server;
a plurality of wireless access points (WAPs) in communication with said server and switching system, each said WAP is capable of operating on a specific radio channel;
a plurality of radio frequency (RF) antennas, wherein at least one antenna is in associated with each said WAP and each said antenna is capable of providing a designated RF radiation pattern, thereby providing a specific area of RF coverage within the passenger cabin,
a plurality of passenger control units (PCUs) each having a wireless network interface circuit (NIC), each said PCU and its associated said NIC being disposed on an associated passenger seat; and
each said NIC including its own antenna and communicating with at least one additional component used at its associated said seat, to interface said at least one additional component to a specific one of said WAPs associated with a specific one of said NICs by utilizing said antenna of said specific one of said NICs.

2. The system of claim 1, wherein each said WAP is further capable of communicating with at least one said NIC by utilizing the RF signals radiated by said associated antenna to the specific area of RF coverage within the passenger cabin in which said NIC is located.

3. The system of claim 2, wherein said antennas are further capable of providing overlapping areas of RF coverage of the passenger cabin area.

4. The system of claim 2, wherein each said antenna is further capable of reducing electromagnetic interference with other systems of the mobile platform by providing RF coverage to the specific area of the passenger cabin.

5. The system of claim 1, wherein each of said WAPs is able to control its RF transmit power, and each of said NICs is further capable of controlling its RF transmit power.

6. The system of claim 1, wherein said WAPs and said NICs are further capable of utilizing orthogonal frequency division multiplexing (OFDM) and advanced digital signal processing (DSP) to achieve a desired level of immunity to interference from other mobile platform systems.

7. The system of claim 1, wherein said system comprises an all digital system.

8. The system of claim 1, wherein said server and switching system is capable of using at least one of Internet Protocol (IP) Multicast and Voice Over IP (VOIP) to reduce bandwidth requirements of said system.

9. The system of claim 1, wherein said server and switching system is capable of using Internet Protocol (IP) Multicast to reduce cabling within said system.

10. A method of communicating data within a passenger cabin area of a mobile platform using a wireless distribution network, said method comprising:
communicating data between a server and switching system, having at least one audio/video server, and a plurality of wireless access points (WAPs);
transmitting data between the WAPs and a plurality of wireless network interface circuits (NICs) using a plurality of antennas, wherein at least one of the antennas is associated with each of the WAPs;
providing each of said NICs with its own antenna;
placing each of said NICs in communication with at least one additional component used by a user at a given seat associated with a given one of said NICs;
operating each of the antennas such that each said antenna of each said WAP radiates a specific RF pattern;
utilizing each said WAP to control its own RF transmit power, thereby reducing RF signal interference with other mobile platform systems; and
utilizing each said NIC to control its RF transmit power, thereby reducing RF signal interference with said other mobile platform systems.

11. The method of claim 10, wherein said communicating data between the head unit and the WAPs comprises reducing bandwidth requirements of the network by adapting the server and switching system to use at least one of Internet Protocol (IP) multicast and Voice Over IP (VOIP).

12. The method of claim 10, wherein said communicating data between the head unit and the WAPs comprises reducing cabling within the network by adapting the head unit to use IP multicast.

13. The method of claim 10, wherein said transmitting data between at least one of the WAPs and the NICs using the antenna comprises operating at least two adjacent ones of the WAPs on different, non-overlapping radio channels.

14. The method of claim 10, wherein said transmitting data between at least one of the WAPs and the NICs using the antenna comprises operating the WAPs on a plurality of overlapping radio channels.

15. The method of claim 10, wherein said transmitting data between the WAPs and the NICs using the antenna of one of the WAPs comprises utilizing orthogonal frequency division multiplexing (OFDM) and digital signal processing (DSP) to minimize interference with other systems of the mobile platform.

16. The method of claim 10, wherein operating each said antenna associated with each said WAP comprises:
adapting each said antenna to provide RF coverage to a specific area of the passenger cabin; and
adapting each said antenna to overlap the specific areas of coverage provided by each by at least one adjacent said antenna.

17. A mobile platform comprising a broadband wireless distribution network for a passenger cabin area, said broadband wireless distribution network comprising:
a plurality of wireless access points (WAPs) connected to a server and switching system;

a plurality of wireless network interface circuits (NICs) located about the passenger cabin on portions of passenger seats within the passenger cabin area, each said NIC including its own antenna and being in communication with at least one additional component usable at a specific seat by a seat occupant;

a plurality of antennas connected to said WAPs such that at least one antenna is connected to each said WAP, said antennas are capable of providing RF coverage to specific overlapping areas within the passenger cabin, thereby allowing communication between each of said WAPs in said overlapping areas and at least one of said NICs in said overlapping areas; and a passenger control unit (PCU) disposed at each said seat, each said PCU being able to establish a wireless communications link with a second one of said WAPs when a communications link with a first one of said WAPs, which said PCU was previously in communication with, is lost.

18. The mobile platform of claim 17, wherein each said antenna of each said WAP is further capable of reducing electromagnetic interference with other systems of the mobile platform by providing RF coverage to the specific area of the passenger cabin.

19. The mobile platform of claim 17, wherein said WAPs and said NICs are capable of utilizing orthogonal frequency division multiplexing (OFDM) and digital signal processing (DSP) to protect against interference from other mobile platform systems.

20. The mobile platform of claim 17, wherein said server and switching system is capable of using Internet Protocol (IP) Multicast to reduce cabling within said network.

21. A broadband wireless distribution system for distributing information from a central information subsystem to a plurality of independent, designated locations within a pre-defined area, said system comprising:

a server and switching sub-system including at least one server for providing said information;

a plurality of wireless access subsystems disposed at pre-designated locations within said pre-defined area, each said wireless access subsystem associated with an antenna capable of providing a pre-determined radio frequency (RF) coverage pattern sufficient to encompass a sub-area of said pre-defined area, each said sub-area including only a sub-plurality of said plurality of independent, designated locations;

a passenger control unit (PCU) disposed at each of said designated locations, each said PCU able to interface with at least one electronic device being used by a user present at a given one of said designated locations associated with a given one of said PCUs;

a plurality of wireless network interface circuits (NICs) each having its own antenna and each being capable of communicating with said antenna of an associated one of said wireless access subsystems, each said NIC further being in communication with an associated one of said PCUs and being located at one of a plurality of seats within said pre-defined area,. and being independently associated with a specific one of said seats to thereby facilitate wireless communications between said electronic device being used at a given one of said seats in a given said sub-area, and said wireless access subsystem associated with said antenna providing said RF coverage pattern encompassing said given sub-area.

22. The system of claim 21, wherein said antennas of each of said wireless access subsystems are each operated in accordance with a different RF channel.

23. The system of claim 21, wherein said antennas of each of said wireless access subsystems provide at least one of overlapping RF coverage patterns and non-overlapping RF coverage patterns.

* * * * *